US007059829B2

(12) United States Patent
Garner

(10) Patent No.: US 7,059,829 B2
(45) Date of Patent: Jun. 13, 2006

(54) COMPRESSOR SYSTEM WITH MOVABLE SEAL LANDS

(75) Inventor: Chad Marcus Garner, Orlando, FL (US)

(73) Assignee: Siemens Power Generation, Inc., Orlando, FL (US)

(*) Notice: Subject to any disclaimer, the term of this patent is extended or adjusted under 35 U.S.C. 154(b) by 226 days.

(21) Appl. No.: 10/774,909

(22) Filed: Feb. 9, 2004

(65) Prior Publication Data

US 2005/0175446 A1    Aug. 11, 2005

(51) Int. Cl.
*F01D 11/02* (2006.01)
(52) U.S. Cl. .............................. 415/173.7; 415/174.2; 277/433
(58) Field of Classification Search ............. 415/173.7, 415/174.2, 171.1, 174.5, 170.1; 416/174; 277/433
See application file for complete search history.

(56) References Cited

U.S. PATENT DOCUMENTS

| 2,919,938 A | 1/1960 | Rose |
| 4,820,119 A | 4/1989 | Joyce |
| 5,100,158 A | 3/1992 | Gardner |
| 5,106,104 A | 4/1992 | Atkinson et al. |
| 5,524,846 A | 6/1996 | Shine et al. |
| 6,042,334 A | 3/2000 | Schilling |
| 6,332,617 B1 | 12/2001 | Leveaux et al. |
| 6,527,274 B1 | 3/2003 | Herron et al. |

FOREIGN PATENT DOCUMENTS

| JP | 58057565 A2 | 4/1983 |
| JP | 58096105 A  * | 6/1983 |

* cited by examiner

*Primary Examiner*—Edward K. Look
*Assistant Examiner*—Richard A. Edgar

(57) ABSTRACT

Aspects of the invention relate to a compressor system for a turbine engine that not only provides large compressor seal clearances as the engine passes through non-standard operating conditions, but also minimizes the clearances during normal engine operation, thereby increasing the efficiency of the compressor. In one embodiment, a substantially annular seal land is secured at one end to an annular extension arm on a compressor disk. When the engine reaches steady state operation, the non-attached end of the seal land can extend radially outward to reduce the clearance between the seal land and a shroud extending over the ends of the adjacent stationary airfoils. The seal land can be designed to resist the rotational forces imparted by the turning rotor until a certain desired operating condition is reached. In one embodiment, the seal land reaches full extension when the engine is operating at about 3600 rpm.

20 Claims, 4 Drawing Sheets

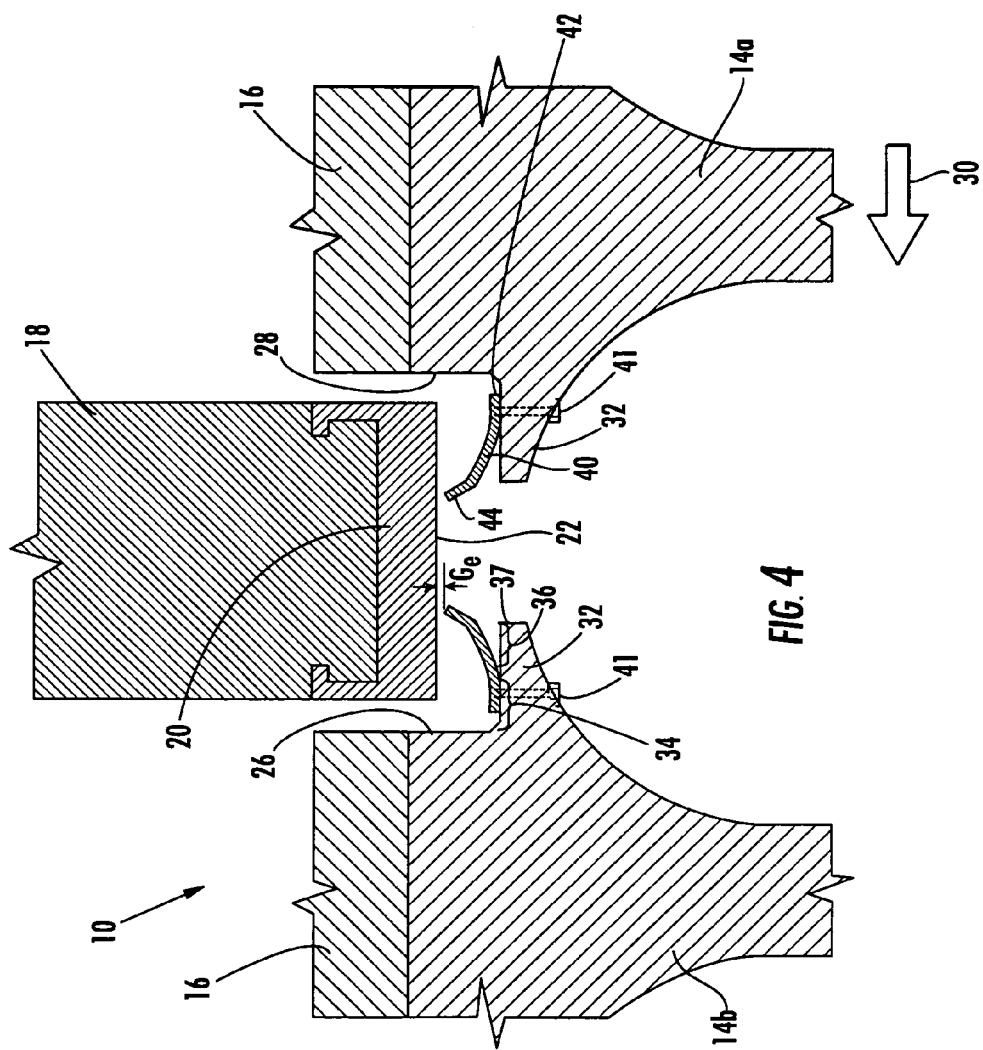

COMPRESSOR SYSTEM WITH MOVABLE SEAL LANDS

FIELD OF THE INVENTION

The invention relates in general to turbine engines and, more particularly, to a system and method for increasing the efficiency of the compressor section of a turbine engine.

BACKGROUND OF THE INVENTION

The compressor section of a turbine engine can comprise several rows of airfoils, alternating between rows of rotating airfoils and rows of stationary airfoils. Each row of rotating airfoils comprises a plurality of airfoils held on a disk which is, in turn, attached to a rotor. Thus, the attached airfoils rotate along with the rotor. Each row of stationary airfoils comprises a plurality of stationary airfoils affixed at one end to the inner periphery of a ring or other airfoil carrier such as a diaphragm pack. The stationary airfoils extend radially inward from the airfoil carrier, terminating at an inner shroud.

The general operation of a compressor is well known in the art—the rotating airfoils force a fluid axially through the compressor while the stationary airfoils compress the fluid. As a fluid passes axially through the compressor, the pressure of the fluid increases. For instance, the fluid pressure on the downstream side of a row of stationary airfoils is greater than the pressure on the upstream side of that same row. The compressed fluid will naturally seek the path of least resistance, that is, the lower pressure upstream side of the stationary airfoil, which can result in reverse axial flow through the compressor, thereby degrading performance. To impede such reverse flow, prior compressors incorporated seal strips extending from the inner shroud of the stationary airfoils, thereby reducing the gap between the inner shroud of the stationary airfoils and the nearby rotating airfoils and/or disk.

While helpful in reducing reverse flow, use of the seals can create another concern in that the seals must be prevented from rubbing against the rotating disk and/or airfoils. Seal rubbing during off design conditions has been known to cause the seals to liberate, wrap around the neighboring stationary airfoils, and ultimately cut through the stationary airfoils, resulting in extended outages and hardware replacement. Thus, it is critical to maintain a clearance between the seals and the rotating airfoils at all times.

In the past, the problem of seal clearances has been approached by providing large seal clearances during non-standard engine conditions where the seal clearances would otherwise be expected to be the smallest because of thermal inequalities and other factors. Examples of such non-standard operating conditions include shut down, hot restart, spin cool, etc., all of which occur when the engine is operating at less than about 3600 rpm. However, because the minimum seal clearances are sized for these off design conditions, the seal clearances become overly large when the engine achieves full speed (i.e. normal operation). Consequently, the compressor/engine experiences measurable performance decreases in power and efficiency due to clearance leakage at normal operation.

Thus, there is a need for a compressor system that not only allows for larger compressor seal clearances as the engine passes through non-standard operating conditions, but also minimizes clearances during normal engine operation, thereby increasing efficiency of the compressor.

SUMMARY OF THE INVENTION

Embodiments of the invention relate to a compressor system for a turbine engine. The system includes a disk secured to a rotor. The disk has a leading axial face and a trailing axial face. At least one of the leading face and the trailing face includes an arm projecting axially therefrom. The arm extends annularly about the respective face.

The system also includes one or more substantially annular seal lands. The seal lands have first and second axial ends. In one embodiment, the second end of the seal land can be flared radially outward. Further, at least a portion of the flared second end of the seal land can extend axially beyond the arm. At least the first end of the seal land is disposed over the arm; at least a portion of the first end of the seal land is fixed to the arm.

The second end of the land is movable between a first position and a second position; the seal land can be biased to the first position. In the first position, the majority of the seal land is substantially adjacent to the seal arm. In the second position, at least the second end of the seal land moves radially outward in response to rotational forces created by the turning of the rotor. The seal land can have an associated spring rate. The spring rate can be such that the second end of the seal land begins to move from the first position when the rotor is rotating at about 3000 rpm. In another embodiment, the spring rate can be such that the second end of the seal land begins to move from the first position when the rotor is rotating at about 3600 rpm.

The arm can include a proximal region and a distal region. The first end of the seal arm can be fixed to the arm in the proximal region. The first end of the seal land can be fixed to the arm by one of fasteners, brazing and welding. The seal land has a distribution of mass along the axial length of the seal land. The distribution of mass can be concentrated at the second end.

Embodiments according to aspects of the invention relate to another compressor system for a turbine engine. In such a system, there is a first disk secured to a rotor. The first disk has a leading axial face and a trailing axial face. At least the trailing face includes an arm projecting axially therefrom and extending annularly about the trailing face. There is also a second disk secured to the rotor downstream of the first disk. The second disk having a leading axial face and a trailing axial face. At least the leading face includes an arm projecting axially therefrom and extending annularly about the leading face. The arm can include a proximal region and a distal region.

A substantially annular seal land is provided for each of the arms. Each seal land has a first axial end and a second axial end. The second end of each seal land can be flared radially outward. At least the first axial end of each seal land is disposed over the arm; at least a portion of the first end of the seal land is fixed to the arm. In one embodiment, the first end of the seal arm can be fixed in the proximal region of the arm. The first end of the seal land can be fixed to the arm by one of fasteners, brazing and welding.

A plurality of stationary vanes extend radially inward toward the rotor and disposed between the first and second disks. A shroud extends over the ends of each of the plurality of vanes. The shroud is near at least the second end of the seal lands.

The second end of the seal lands are movable between a first position and a second position. In the first position, an initial gap is defined between the second end of the seal lands and the shroud. In one embodiment, one or more seals strips can be attached to the shroud and extend radially away therefrom. In such case, the gap can be defined between the second end of the seal lands and the ends of the seal strips. In the second position, at least the second end of the seal lands move radially outward in response to rotational forces of the turning rotor so as to reduce the gap. The seal land can be biased toward the first position.

The seal land can have an associated spring rate. The spring rate can be such that the second end of the seal land begins to move from the first position when the rotor is rotating at about 3000 rpm or at about 3600 rpm. The seal land has a distribution of mass along the axial length of the seal land, and the distribution of mass can be concentrated at the second end.

Other embodiments according to aspects of the invention are directed to a method for increasing the efficiency of a turbine engine compressor. According to such a method, a turbine engine is provided having a compressor section. The compressor section includes a first disk secured to a rotor, and a second disk secured to the rotor downstream of the first disk. Each of the disks has a leading axial face and a trailing axial face. At least one of the trailing face of the first disk and the leading face of the second disk includes an arm projecting axially therefrom and extending annularly about the face.

The compressor section also includes a substantially annular seal land having first and second axial ends. At least the first end of the seal land is disposed over the arm and at least a portion of the first end of the seal land is fixed to the arm. Further, the compressor includes a row of radially inwardly extending stationary vanes. The row of vanes is disposed adjacently downstream of the first disk. Each of the plurality of vanes terminating at a vane shroud near the seal lands. An initial gap is defined between the second end of the seal lands and the vane shroud.

A turbine engine with such a compressor section is operated such that the compressor rotor turns at about 2300 rpms to about 3600 rpms. The rotational forces generated by the turning rotor can be used to move at least the second end of the seal land radially outward from the first position so as to reduce but not completely close the gap. In one embodiment, the second end of the seal land can be fully radially outwardly extended at about 3600 rpms.

BRIEF DESCRIPTION OF THE DRAWINGS

FIG. 4 is a cross-sectional of the compressor section of a turbine engine according to aspects of the invention, showing a stationary airfoil without seal strips extending from the inner shroud and the seal lands in a second position.

DETAILED DESCRIPTION OF EMBODIMENTS OF THE INVENTION

Aspects of the present invention improve upon prior compressor systems used in connection with turbine engines. Aspects of the present invention relate to a compressor system having movable seal lands that permit relatively large clearances during non-normal operating conditions and relatively minimal clearances during normal operation of the engine, thereby enhancing the performance of the compressor/engine.

Embodiments of the invention will be explained in the context of one possible compressor system, but the detailed description is intended only as exemplary. Embodiments of the invention are shown in FIGS. 1–4, but the present invention is not limited to the illustrated structure or application.

Figure 1:
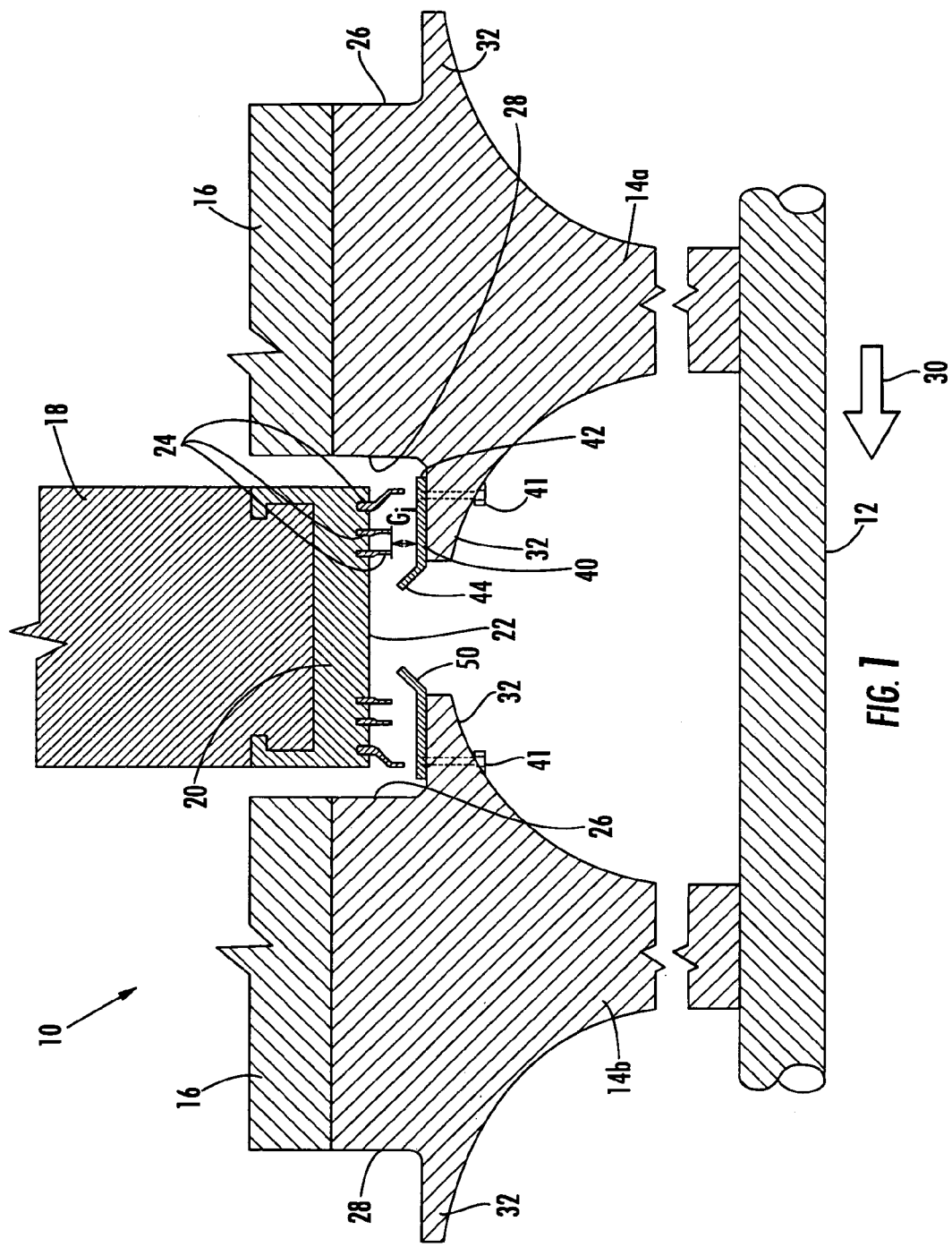
FIG. 1 is a cross-sectional of the compressor section of a turbine engine according to aspects of the invention, showing a stationary airfoil with seal strips extending from the inner shroud and the seal lands in a first position.
Figure 2:
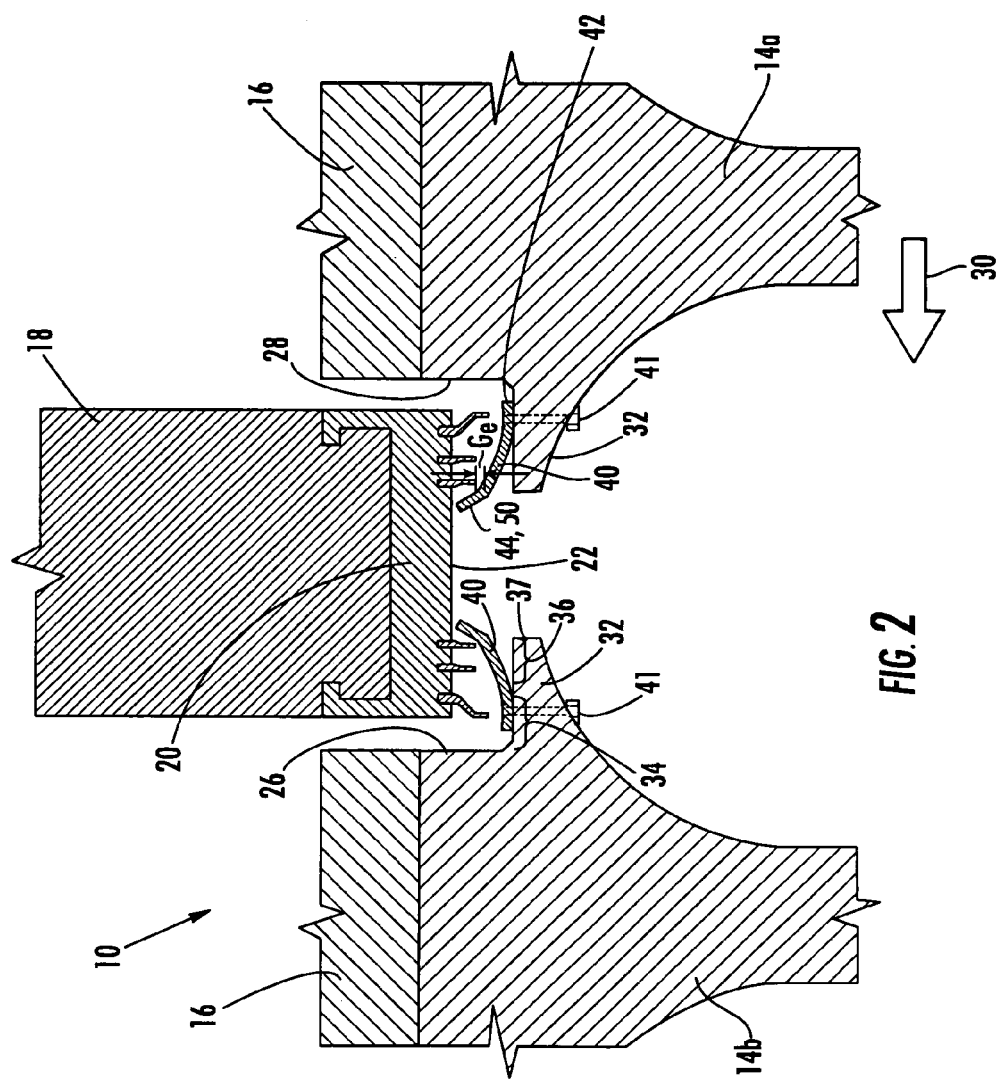
FIG. 2 is a cross-sectional of the compressor section of a turbine engine according to aspects of the invention, showing a stationary airfoil with seal strips extending from the inner shroud and the seal lands in a second position.
Figure 3:
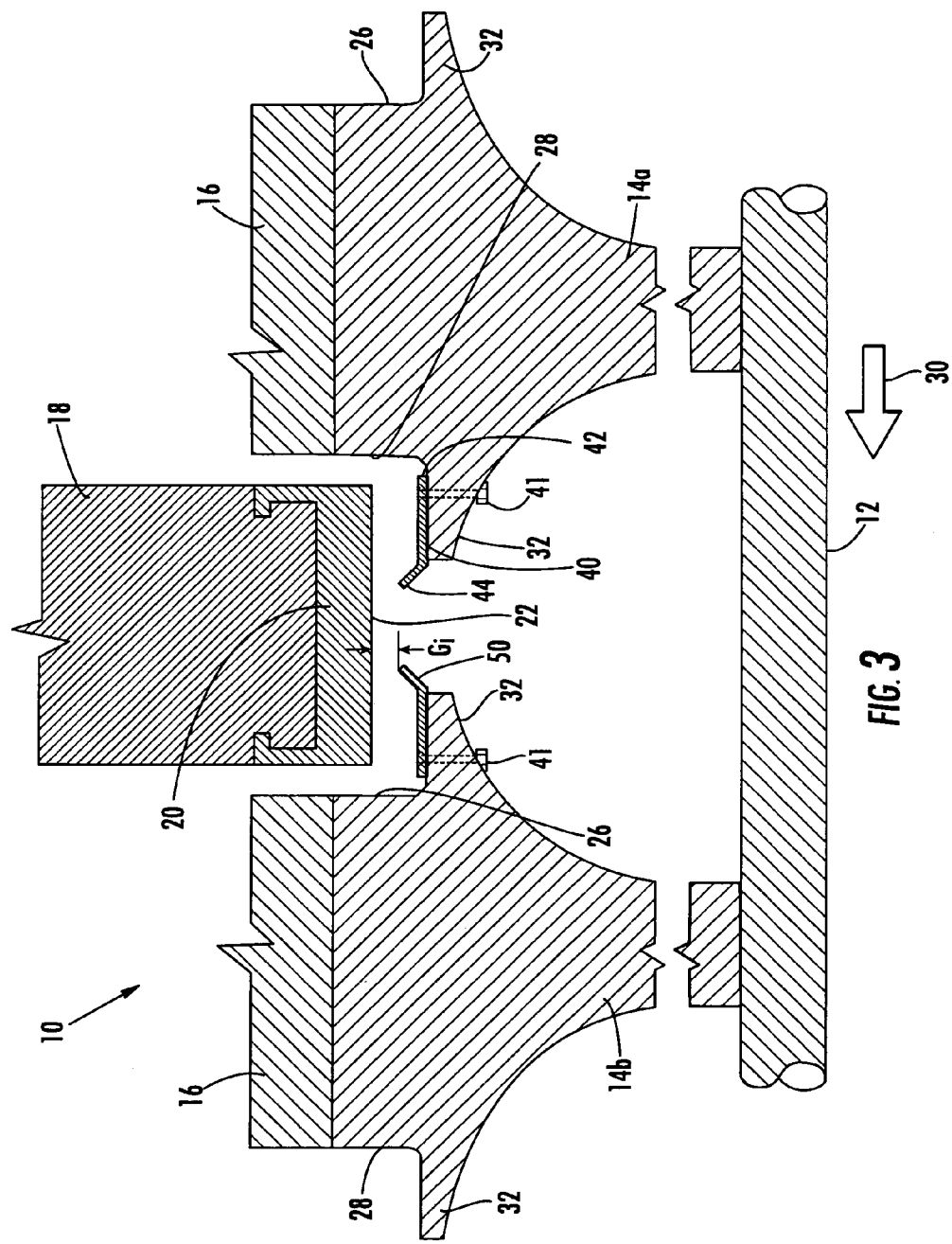
FIG. 3 is a cross-sectional of the compressor section of a turbine engine according to aspects of the invention, showing a stationary airfoil without seal strips extending from the inner shroud and the seal lands in a first position.

FIG. 1 shows an embodiment of a compressor system 10 according to aspects of the invention. The compressor 10 includes a rotatable shaft or rotor 12 on which one or more disks 14*a*, 14*b* (collectively referred to herein as 14) are secured as is known in the art. Each of the disks 14 can host a plurality of airfoils 16 disposed about the periphery of the disk so as to form a row, the airfoils 16 extend radially outward from the disk 14. There can be several disks 14 spaced axially along the rotor 12. For example, as shown in FIG. 1, there can be at least a first disk 14*a* and a second disk 14*b* positioned axially downstream of the first disk 14*a*. Spaced between each row of blades 14 can be a row of stationary airfoils 18, which are referred to as vanes, stators, or diaphragms. The stationary airfoils 18 can be fixed at one end to a stationary structure (not shown), as is known in the art, and can extend radially inward therefrom. For each row of stationary airfoils 18, a shroud 20 can span substantially continuously across or over the ends of the stationary airfoils 18, as is known in the art. One or more seal strips 24 can be secured to the outer peripheral surface 22 of the shroud 20, as shown in FIGS. 1–2. The seal strips 24 can extend radially away from the outer peripheral surface 22 of the shroud 20, that is, radially inward toward the rotor 12. Further, the seal strips 24 can extend substantially continuously about the outer peripheral surface 22 of the shroud 20. It should be noted that aspects of the invention can also be applied to stationary airfoils 18 that do not have the seal strips 24 associated with the shroud 20. Thus, when the shroud 20 of a stationary airfoil 18 is referred to herein, it is intended to cover at least these two configurations.

The disks 14 can have a leading axial face 26 and a trailing axial face 28. The leading axial face 26 refers to that side of the disk 14 that faces the oncoming fluid 30, such as air, whereas the trailing axial face 28 refers to that side of the disk 14 that does not face the oncoming fluid 30. For at least one of the disks 14 in the compressor system, at least one of the leading face 26 and trailing face 28 can include an arm 32 projecting axially therefrom and extending substantially annularly about the respective face of the disk 14. In one embodiment, the arm 32 is generally circular in cross-section. In another embodiment, the arm 32 can be generally polygonal in cross-section.

The arm 32 may be substantially continuous or it may contain breaks along its annular span. Further, the arm 32 can include a proximal region 34 and a distal region 36. The proximal region 34 refers to that portion of the arm 32 that is axially closer to the disk 14 itself; the distal region 36 refers to that axially outward portion of the arm 32 including the axial end 37 of the arm 32. The cross-sectional area of the arm 32 can but need not be substantially constant. The above described disks 14 are known in the art, and aspects of the invention are not limited to any particular disk 14.

Another component according to embodiments of the invention is a seal land 40. The seal land 40 can be substantially annular, and, in one embodiment, the land can be substantially cylindrical in conformation. However, the seal land 40 is not limited to any particular conformation or cross-sectional geometry. Further, the seal land 40 can be substantially continuous in both its axial and peripheral directions. It should be noted that the cross-sectional geometry of the seal land 40 can vary at least along its axial length.

The seal land 40 can have first and second axial ends 42,44. Preferably, at least the first end 42 of the seal land 40 is sized and shaped to correspond to the annular arm 32 on the disks 14 such that the seal land 40 can be placed or disposed over and/or around the seal arm 32. The seal land 40 can be fixed to the arm 32 on the disk 14. The securement of the seal land 40 to the arm 32 can be achieved in any of a number of ways. For instance, the seal land 40 can be brazed or welded to the arm 32. Alternatively, the seal land 40 can be secured to the arm 32 using various fasteners, such as bolts 41 or rivets.

In one embodiment, the first end 42 can be attached to the arm 32. For instance, the first end 42 of the seal land 40 can be fixed or anchored at any place along the arm 32, preferably in the proximal region 34 of the arm 32. Further, there are multiple points along the axial length of the seal land 40 at which the seal land 40 can be fixed. For example, the seal land 40 can be fixed at its first end 42. Alternatively, the seal land can be fixed at some point around its first end 42. Moreover, the securement can be continuous or intermittent, regularly or irregularly, about the annular span of the seal land 40.

In any event, a portion of the seal land 40 can extend substantially adjacent to the seal arm 32. "Substantially adjacent" means that the seal land 40 can lie in axial contact with the arm 32 or there can be a slight spacing. In one embodiment, the majority of the axial length of the seal land 32 can be substantially adjacent to the seal arm 32. At least a portion of the seal arm 32 can extend axially beyond the extreme distal end 37 of the seal arm 32. For example, as shown in FIG. 1, at least a portion of the second end 44 of the seal land 40 can extend axially past the arm 32. Such positions can be generally referred to as a first position of the seal land 40. When in the first position, an initial gap $G_i$ can defined between the second end 44 of the seal lands 40 and the shroud 20 and/or between the second end 44 of the seal lands 40 and the ends of the seal strips 24. In one embodiment, the seal lands 40 can be biased into the first position, through their own resiliency or otherwise.

The second end 44 of the seal land 40 can remain substantially unattached. Further, the second end 44 can be substantially straight (not shown) or it can be flared radially outward 50, as shown in FIG. 1. It is preferred if the second end 44 of the seal land 40 is flared for it can be beneficial in minimizing reverse axial flow by providing a labyrinth effect or tortuous path so as to impede such flow. The flared second end 50 can facilitate minimization of the initial gap $G_i$ when the engine is operating under steady state conditions, as will be discussed later. When a flared end 50 is provided, at least a portion of the flared end 50 can extend axially beyond the distal end 37 of the arm 32.

The seal land 40 can be bendable, flexible and/or otherwise pliable. The seal land 40 can act as a spring along its length; accordingly, the seal land 40 can have an associated spring force, which can be designed to respond to rotational forces at certain desired operating conditions, whereby the free second end 44 of the seal land 40 can begin to move away from its first position. For instance, the spring force can be such that the second end 44 of the seal land 40 does not begin to move from the first position until the engine is operating at about 3000 rpm. In either case, it is preferred if the second end 44 of the seal land 40 is fully extended once the engine is operating at about 3600 rpm. When the seal land 40 is fully extended, the gap reduces from $G_i$ to $G_e$. At all times, regardless of whether the second end of the seal land is in the first position, second position or somewhere in between, no part of the seal land 40 actually touches any part of the stationary airfoils 18 or its associated shroud 20.

It should be noted that these operational ranges are merely provided as examples as the operational speed and pinch points of concern can vary from engine to engine. Thus, embodiments of the invention are not limited to specific operational points or ranges.

The desired spring rates can be achieved through alterations to the geometry (length, width and height) and material properties (i.e., using different materials, treating the material as needed, etc.) of the seal land 40. Further, as mentioned earlier, the pressure of the fluid 30 increases as the fluid 30 passes axially downstream in the compressor 10. At some point, the variance in pressure may need to be taken into account when determining the spring rate for the seal land 40. Thus, when more than one seal land 40 is used in the compressor 10, the seal land 40 can but need not have substantially equal spring rates.

The rotational forces, such as centrifugal loads, imparted on the seal land 40 by the turning of the rotor 12, tend to urge at least the second end 44 of the seal land 40 radially outward. When the rotational forces exceed the spring rate of the free end 44 of the seal land 40, the second or free end 44 can begin to move away from the first position. As noted above, in one embodiment, the second end 44 of the seal land 40 can be fully radially outwardly extended in response to the rotational forces experienced when the engine is operating at about 3600 rpm. In such case, the seal land 40 can be considered to be in its second position. Again, the operation condition of 3600 rpm is only one of a plethora of operating conditions in which a seal land 40 can be set to reach full extension. It is used herein because in at least one engine design, all of the non-standard design conditions of concern occur below 3600 rpm. Obviously, the operating conditions specific to each engine and/or compressor design will factor into the consideration of which operating condition will force the seal land 40 into the second position. When the engine is operating at less than 3600 rpm or other design point, the second end moves away from the first position.

Inherently, the seal land 40 has a overall mass, and the mass can be distributed axially along the length of the seal land 40 in a variety of ways. For instance, the mass can be distributed substantially equally along the axial length of the seal land 40. In some cases, however, the centrifugal loads in the compressor 10 may not be strong enough to move the second end 44 of the seal land 40 radially outward. Therefore, in order to facilitate movement of the second end 44 of the seal land 40, the distribution of mass can be concentrated at or near the second end 44. The concentration of mass at or near the second end 44 of the seal land 40 can be achieved in a number of ways such as providing for an increased cross-sectional geometry or a mass can be added to the end as would be understood by one skilled in the art.

The seal land 40 can be made of any of a variety of materials, but, preferably, the seal land 40 is made of the same material as the disks 32 to which it is attached so as to minimize concerns of thermal reactions. In one embodiment, the seal land 40 can be made of a high strength carbon steel. The compressor seal land 40 can be a continuous piece or it can be a multi-part construction. The seal land 40 can be made of any of a variety of processes. For instance, it can be stamped from a single sheet of metal. Alternatively, the seal land 40 can be one or more pieces of sheet metal that are bent as necessary and then welded or brazed together along axial seams. Alternatively, it can be made of one or more segments of ring stock. If necessary, the desired features can be machined in as needed.

Embodiments of the invention can be applied to new designs and, in some cases, can be retrofitted into existing compressor systems. For example, the seals lands 40 according to the invention can be added to compressor disks 14 that already have arms 32. In such case, the thickness of the arms 32 or the length of the seal strips 24, if any, may have to be reduced by machining or otherwise in order to accommodate the extra thickness of the seal lands 40.

Having described compressor systems according to aspects of the invention, an example of the operation of such a compressor system will now be described. The following description is provided in the context of one compressor system according to aspects of the invention. Of course, aspects of the present invention can be employed with respect to myriad compressor designs, including all of those described above, as one skilled in the art would appreciate.

In one method, a turbine engine is provided having a compressor section 10. As shown in FIG. 1, the compressor section 10 can include a first disk 14a and a second disk 14b secured to a rotor 12. The second disk 14b can be positioned axially downstream of the first disk 14a. Each disk 14 can have a leading axial face 26 and a trailing axial face 28. In one arrangement, the trailing face 28 of the first disk 14a and/or the leading face 26 of the second disk 14a can include an arm 32 projecting axially therefrom and extending annularly about the respective face. A substantially annular seal land 40 can be provided having first and second axial ends 42,44. At least the first end 42 of the seal land 40 can be disposed over the arms 32 of the disks 14 and at least a portion of the first end 42 of the seal land 40 can be fixed to the arm 32.

The compressor 10 can further include a row of radially inwardly extending stationary airfoils 18. The stationary airfoils 18 can be disposed between the first and the second disks 14a,14b. Each of the plurality of stationary airfoils 18 in the row can terminate at a shroud 20 near the seal lands 40. With respect to the compressor system shown in FIG. 1, an initial gap $G_i$ can be defined between the second end 44 of the seal lands 40 and the ends of the seal strips 24 on the stationary airfoil 18. In the compressor system shown in FIG. 3, an initial gap $G_i$ can be defined between the second end 44 of the seal lands 40 and tip 20 of the stationary airfoils 18.

A turbine engine having such a compressor system 10 can be operated such that the compressor rotor 12 turns. As shown in FIG. 2, the rotational forces of the turning rotor 12 can move at least the second end 44 of the seal land 40 radially outward from its first position so as to reduce but not completely close the gap $G_i$. In one embodiment, the second end 44 of the seal land 40 can begin to elastically bend, curve or bow radially outward from the first position at about 3000 rpm and can be fully radially outwardly extended when the rotor turns at about 3600 rpm. Thus, for speeds of less than about 3000 rpm, the spring force of the seal lands 40 are greater than the rotational forces experienced by the system 10. While the seal lands 40 may move so as to close the gap $G_i$ between the second end 44 of the seal lands 40 and the shroud 20 associated with the stationary airfoils 18 or the ends of the seal strips 24, at no time do the seal lands 40 touch the adjacent stationary airfoil 18, shroud 20 or hardware mounted thereon. It should be noted that, for purposes of facilitating discussion, the degree of movement of the seal land in FIG. 2 is exaggerated from what may actually occur. In operation, it is expected that the magnitude of such extension will be on the order of about one tenth of an inch. When the rotational forces drop below a certain level, the seal lands 40 can begin to retract. For example, during a shut down, when the engine speed drops below 3000 rpm, the spring force of the seal land 40 becomes greater than the rotational forces, allowing the seal land 40 to move toward the first position.

A compressor system 10, as configured and operated above, will provide compressor seal clearances as the engine passes through "off design" operating conditions such as shut down, hot restart, spin cool, etc. In addition, the compressor system 10 allows the design flexibility to set for the minimum clearances during normal operation, reducing performance losses due to clearance leakage.

While especially suited for the upstream rows of airfoils in the compressor, aspects of the invention can be applied to any row of airfoils. In one embodiment, aspects of the invention can be applied to every row of airfoils in the compressor. However, not every row in the compressor must be configured according to aspects of the invention; for instance, only some of the rows can be configured according to the invention. Further, the seal lands 40 need not be associated with every arm 32 provided on the disks 14. For example, as shown in FIG. 1, the first disk 14a only has a seal land on its trailing face 28, but not on its leading face 26. Similarly, the second disk 14b only has a seal land on its leading face 26. Aspects of the present invention can be employed with respect to myriad compressor designs as one skilled in the art would appreciate. Thus, it will of course be understood that the invention is not limited to the specific details described herein, which are given by way of example only, and that various modifications and alterations are possible within the scope of the invention as defined in the following claims.

What is claimed is:

1. A compressor system for a turbine engine comprising:
   a disk secured to a rotor, the disk having a leading axial face and a trailing axial face, wherein at least one of the leading face and the trailing face includes an arm projecting axially therefrom and extending annularly about the respective face; and
   at least one substantially annular seal land having first and second axial ends, wherein at least the first end of the seal land is disposed over the arm and at least a portion of the first end of the seal land is fixed to the arm, wherein the second end of the land is movable between a first position, in which the majority of the seal land is substantially adjacent to the seal arm, and a second position, in which at least the second end of the seal land moves radially outward in response to rotational forces created by the turning of the rotor.

2. The system of claim 1 wherein the seal land is biased toward the first position.

3. The system of claim 1 wherein the arm includes a proximal region and a distal region, the first end of the seal arm is fixed in the proximal region of the arm.

4. The system of claim 1 wherein the first end of the seal land is fixed to the arm by one of fasteners, brazing and welding.

5. The system of claim 1 wherein the second end of the seal land is flared radially outward.

6. The system of claim 5 wherein at least a portion of the flared second end of the seal land extends axially beyond the arm.

7. The system of claim 1 wherein the seal land has a distribution of mass along the axial length of the seal land, wherein the distribution of mass is concentrated at the second end.

8. The system of claim 1 wherein the seal land has an associated spring rate, the spring rate being such that the second end of the seal land begins to move from the first position when the rotor is rotating at about 3000 rpm.

9. The system of claim 1 wherein the seal land has an associated spring rate, the spring rate being such that the second end of the seal land is substantially in the second position when the rotor is rotating at about 3600 rpm.

10. A compressor system for a turbine engine comprising:
a first disk secured to a rotor, the first disk having a leading axial face and a trailing axial face, wherein at least the trailing face includes an arm projecting axially therefrom and extending annularly about the trailing face;
a second disk secured to the rotor downstream of the first disk, the second disk having a leading axial face and a trailing axial face, wherein at least the leading face includes an arm projecting axially therefrom and extending annularly about the leading face;
a substantially annular seal land for each of the arms, each seal land having first and second axial ends, wherein at least the first end of each seal land is disposed over the arm and at least a portion of the first end of the seal land is fixed to the arm;
a plurality of stationary vanes extending radially inward toward the rotor and disposed between the first and second disks, a shroud extending over the ends of each of the plurality of vanes, the shroud being near at least the second end of the seal lands,
wherein the second end of the seal lands are movable between a first position defining an initial gap between the second end of the seal lands and the shroud and a second position in which at least the second end of the seal lands move radially outward in response to rotational forces of the turning rotor so as to reduce the gap.

11. The system of claim 10 wherein the seal land is biased toward the first position.

12. The system of claim 10 wherein the second end of each seal land is flared radially outward.

13. The system of claim 10 further including one or more seals strips are attached to the shroud and extend radially away therefrom, wherein the gap is defined between the second end of the seal lands and the ends of the seal strips.

14. The system of claim 10 wherein the seal land has an associated spring rate, the spring rate being such that the second end of the seal land begins to move from the first position when the rotor is rotating at about 3000 rpm.

15. The system of claim 10 wherein the seal land has an associated spring rate, the spring rate being such that the second end of the seal land is substantially in the second position when the rotor is rotating at about 3600 rpm.

16. The system of claim 10 wherein the arm includes a proximal region and a distal region, the first end of the seal land is fixed in the proximal region of the arm.

17. The system of claim 10 wherein the first end of the seal land is fixed to the arm by one of fasteners, brazing and welding.

18. The system of claim 10 wherein the seal land has a distribution of mass along the axial length of the seal land, wherein the distribution of mass is concentrated at the second end.

19. A method for increasing the efficiency of a turbine engine compressor comprising the steps of:
(a) providing a turbine engine having a compressor section, the compressor section including:
a first disk secured to a rotor;
a second disk secured to the rotor downstream of the first disk, each of the disks having a leading axial face and a trailing axial face, wherein at least one of the trailing face of the first disk and the leading face of the second disk includes an arm projecting axially therefrom and extending annularly about the face;
a substantially annular seal land having first and second axial ends, wherein at least the first end of the seal land is disposed over the arm and at least a portion of the first end of the seal land is fixed to the arm;
a row of radially inwardly extending stationary vanes, the vanes disposed adjacently downstream of the first disk, each of the plurality of vanes terminating at a vane shroud near the seal lands, wherein an initial gap is defined between the second end of the seal lands and the vane shroud;
(b) operating the turbine engine such that the compressor rotor turns at about 2300 rpms to about 3600 rpms; and
(c) using the rotational forces of the turning rotor to move at least the second end of the seal land radially outward from the first position so as to reduce but not completely close the gap.

20. The method of claim 19 wherein the second end of the seal land is fully radially outwardly extended at about 3600 rpms.

* * * * *